US008705998B2

(12) United States Patent
Kimura

(10) Patent No.: US 8,705,998 B2
(45) Date of Patent: Apr. 22, 2014

(54) PRINTING APPARATUS, PRINTING CONTROL METHOD, AND STORAGE MEDIUM

(75) Inventor: Yusuke Kimura, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 13/328,866

(22) Filed: Dec. 16, 2011

(65) Prior Publication Data

US 2012/0163852 A1 Jun. 28, 2012

(30) Foreign Application Priority Data

Dec. 27, 2010 (JP) ................................ 2010-290205

(51) Int. Cl.
*G03G 15/00* (2006.01)
*G06K 15/00* (2006.01)
*G06K 9/00* (2006.01)

(52) U.S. Cl.
USPC ................ 399/82; 399/18; 399/19; 358/1.14; 382/112

(58) Field of Classification Search
USPC ......... 399/18, 19, 82; 358/1.14; 382/110, 112
See application file for complete search history.

(56) References Cited

U.S. PATENT DOCUMENTS

| | | | | |
|---|---|---|---|---|
| 6,769,718 | B1 * | 8/2004 | Warther et al. | 283/61 |
| 6,919,967 | B1 * | 7/2005 | Pentecost et al. | 358/1.15 |
| 7,426,054 | B1 * | 9/2008 | Saito | 358/1.16 |
| 7,593,120 | B2 * | 9/2009 | Kitora et al. | 358/1.13 |
| 8,075,211 | B2 * | 12/2011 | Yamamoto | 400/621 |
| 8,094,327 | B2 * | 1/2012 | Ogasawara | 358/1.14 |
| 8,294,942 | B2 * | 10/2012 | Myoki | 358/1.18 |
| 8,314,949 | B2 * | 11/2012 | Rijavec | 358/1.13 |
| 2003/0133721 | A1 * | 7/2003 | Brewington | 399/19 |
| 2005/0111052 | A1 * | 5/2005 | Nishikawa et al. | 358/448 |
| 2006/0008113 | A1 * | 1/2006 | Matsukubo et al. | 382/100 |
| 2007/0247658 | A1 * | 10/2007 | Barnes | 358/1.15 |
| 2008/0002225 | A1 * | 1/2008 | Iwasaki | 358/1.15 |
| 2008/0055626 | A1 * | 3/2008 | Root et al. | 358/1.14 |
| 2008/0259387 | A1 * | 10/2008 | Hirai | 358/1.15 |
| 2008/0259392 | A1 * | 10/2008 | Tokumoto | 358/1.15 |
| 2009/0027701 | A1 * | 1/2009 | Alimpich et al. | 358/1.9 |
| 2009/0033954 | A1 * | 2/2009 | Bray | 358/1.9 |
| 2009/0284780 | A1 * | 11/2009 | Kitora et al. | 358/1.13 |
| 2009/0284801 | A1 * | 11/2009 | Sakaue et al. | 358/3.27 |
| 2009/0310156 | A1 * | 12/2009 | Yamazaki | 358/1.9 |
| 2010/0177346 | A1 * | 7/2010 | Mita | 358/1.15 |
| 2011/0007340 | A1 * | 1/2011 | Masuyama | 358/1.14 |
| 2011/0013209 | A1 * | 1/2011 | Yamazaki | 358/1.9 |
| 2011/0058232 | A1 * | 3/2011 | Matsuoka | 358/474 |
| 2011/0255126 | A1 * | 10/2011 | Iguchi | 358/1.15 |
| 2012/0086974 | A1 * | 4/2012 | Kiuchi | 358/1.15 |

FOREIGN PATENT DOCUMENTS

| | | |
|---|---|---|
| JP | 2010-42601 A | 2/2010 |

* cited by examiner

*Primary Examiner* — Walter L Lindsay, Jr.
*Assistant Examiner* — David Bolduc
(74) *Attorney, Agent, or Firm* — Canon U.S.A., Inc., IP Division

(57) ABSTRACT

A printing apparatus capable of processing a variable data printing (VDP) job including a plurality of records includes a determination unit configured to determine whether the number of occurrences of printing failures depending on a reusable object included in the VDP job is greater than or equal to a set number of times, and whether the number of appearing times of the reusable object on remaining pages of the VDP job is less than a set value, and a printing control unit configured to control continuing or cancelling the variable data printing job based on a determination result of the determination unit.

18 Claims, 7 Drawing Sheets

500

PRINTING APPARATUS, PRINTING CONTROL METHOD, AND STORAGE MEDIUM

BACKGROUND OF THE INVENTION

1. Field of the Invention

The present invention relates to a printing apparatus, a printing control method, and a program.

2. Description of the Related Art

In printing apparatuses, a printing failure such as shifting of a printing position, density unevenness, or stain sticking may occur. For example, in an electrophotographic printing apparatus, when a trouble occurs during a process of forming, transferring or fixing a toner image, a printing failure such as density unevenness, stain sticking, or a streak, a flaw or blurring on a sheet occurs. In the case of printing of print data including a color gamut near a boundary of a support range of the printing apparatus, density unevenness may occur depending on a state of the printing apparatus. If printing is continued in such a state of a printing failure, resources are wastefully consumed.

To inspect such a printing failure, there is an inspection apparatus that reads a printed image by a line sensor (e.g., a camera), and compares the read image with an image to be originally printed to measure a difference. The inspection apparatus uses a method for determining "occurrence of printing failure" if there is a predetermined difference between both images and then canceling sheet feeding and printing.

Japanese Patent Application Laid-Open No. 2010-42601 discusses a technique for canceling, to perform appropriate printing control for a printing failure, sheet feeding when the printing failure is detected, detecting printing failures of residual sheets, and performing automatic cleaning/adjustment when a detection value is equal to or more than a predetermined reference value to resume printing. The technique discussed in Japanese Patent Application Laid-Open No. 2010-42601 issues, when printing failures are detected on a predetermined number of sheets after the automatic cleaning/adjustment, a warning to an operator to stop the printing apparatus.

To reduce wasteful consumption of resources, a user can use a method for detecting a defect in a printed product and canceling printing when a printing failure is detected. However, in the case of a job including a great volume of pages such as a variable data printing (VDP) job, cancellation of printing for each detected defect deteriorates the production efficiency. Further, if the printing is immediately canceled, no solution to periodically occurring failures (drum flaws) can be provided to the user.

A method for canceling printing when printing failures reach a predetermined number or more can prevent the deterioration of the production efficiency caused by frequent cancellation. However, this method permits outputting of wasteful printed products including defects. In the case of variable printing, contents differ from one page to another. However, in some pages, the same object may be used. When the object includes a cause of a printing failure, there is a high possibility of occurrence of the printing failure in the other pages that use the object, so that it needs to cancel the printing. However, a possibility of the printing failure is low in pages that do not include the object. Thus, the continued printing may improve the productivity.

SUMMARY OF THE INVENTION

The present invention is directed to improvement of printing productivity by automatically performing appropriate printing control.

According to an aspect of the present invention, a printing apparatus capable of processing a variable data printing (VDP) job including a plurality of records includes a determination unit configured to determine whether the number of occurrences of printing failures depending on a reusable object included in the VDP job is greater than or equal to a set number of times, and whether the number of appearing times of the reusable object on remaining pages of the VDP job is less than a set value, and a printing control unit configured to control whether to continue or cancel the variable data printing job based on a determination result of the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
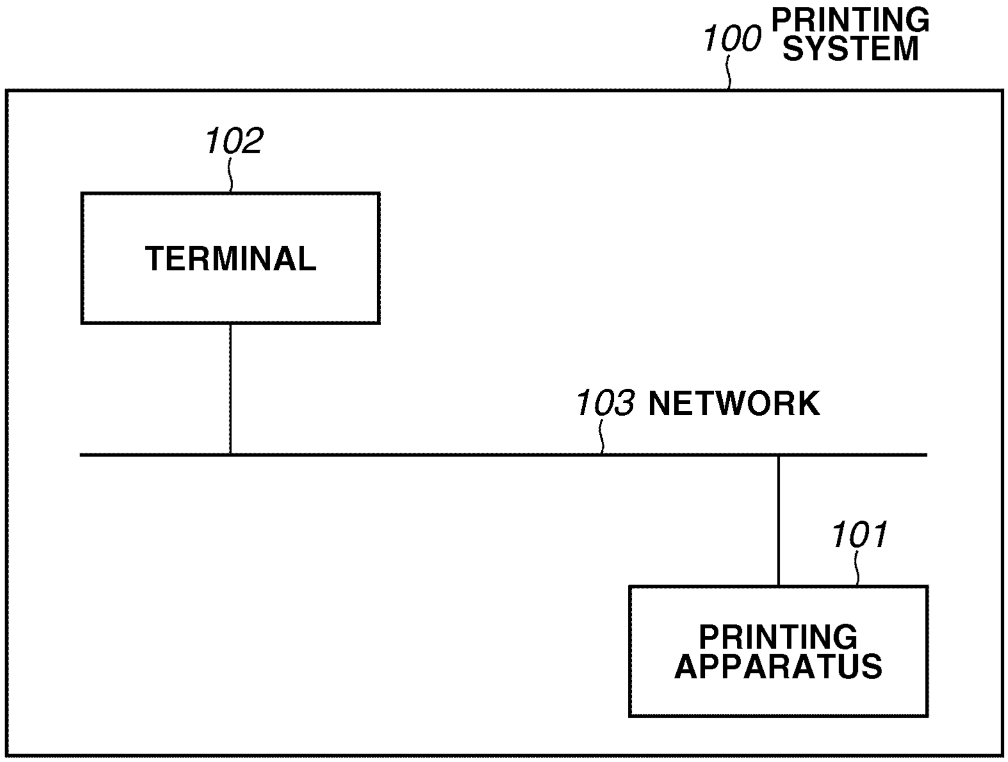
FIG. 1 illustrates an example of a system configuration of a printing system.

FIG. 1 illustrates an example of a system configuration of a printing system according to a first exemplary embodiment.

As illustrated in FIG. 1, a printing system 100 according to the present exemplary embodiment includes a printing apparatus 101 that performs printing, and a terminal 102 that creates print data to instruct printing. The printing apparatus 101 and the terminal 102 are interconnected via a network 103.

Figure 2:
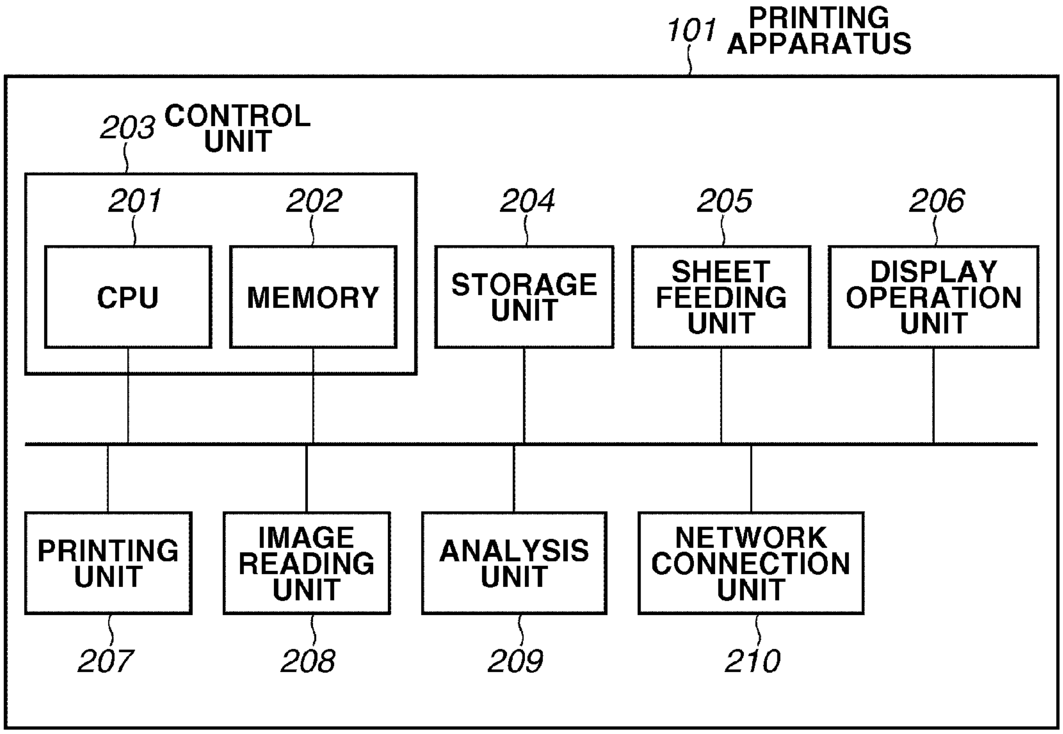
FIG. 2 illustrates an example of a hardware configuration of a printing apparatus.

FIG. 2 illustrates an example of a hardware configuration of the printing apparatus 101. As illustrated in FIG. 2, the printing apparatus 101 includes a control unit 203 that includes a central processing unit (CPU) 201 and a memory 202, a storage unit 204, a sheet feeding unit 205, a display operation unit 206, a printing unit 207, an image reading unit 208, an analysis unit 209, and a network connection unit 210. The analysis unit 209 analyzes a data structure of an input print job (e.g., a VDP job including a plurality of records). The network connection unit 210 connects the printing apparatus 101 to the network 103.

As another configuration of the printing apparatus 101, when a printer controller that controls printing is installed on the same network, the analysis unit 209 can be separated from the printing apparatus 101 to be included in the printer controller connected to the network 103. In the case of this configuration, when a print job is input from the terminal, print data is transmitted to the printing apparatus via the printer controller.

The control unit 203 rasterizes the print data of the print job, performs image processing on the print data when necessary, and creates image data necessary for printing. The control unit 203 transfers the created image data to the storage unit 204. Further, the control unit 203 compares the image data to be printed with image data read from a printed product by the image reading unit 208 and compares a difference of pixel information (color, density, and the like) with a threshold value to detect a printing failure. When detecting the printing failure, the control unit 203 controls a sheet feeding operation, determines a type of the printing failure, and controls the printing apparatus 101 to continue printing, to continue printing of only a printable portion, or to cancel printing based on the number, a rate, and a type of the printing failure.

The display operation unit 206 displays a screen for operating the printing apparatus 101, a screen for notifying of information regarding a printing failure, a screen for notifying of printing cancellation, a screen for notifying of maintenance, or a setting screen of the printing apparatus. The display operation unit 206 notifies the control unit 203 of ON/OFF of printing failure inspection, a threshold value used for determination of the printing failure inspection, a threshold value for determining printing control when a printing failure occurs, a protection setting of a discharging order of printed products, and an operation setting when the printing failure occurs, which have been input.

The image reading unit 208 reads an image of a printed product passing through the printing unit, and transfers the read image to the control unit 203.

Figure 3:
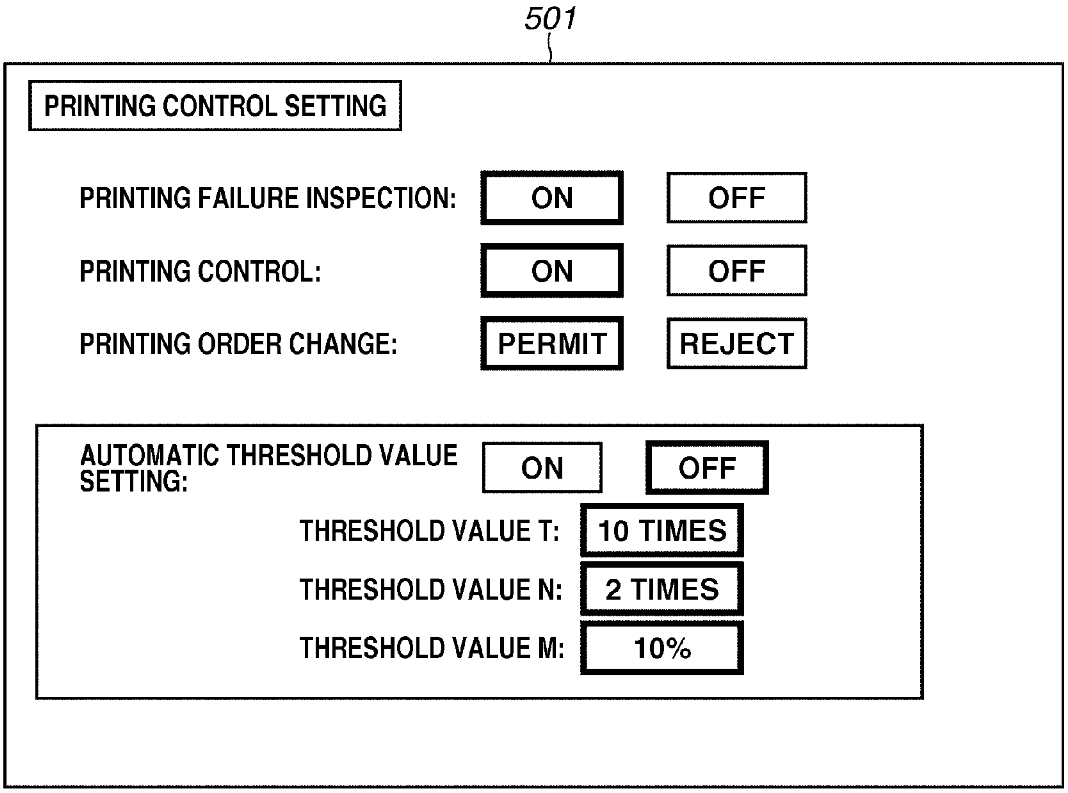
FIG. 3 illustrates an example of a printing control setting screen.

The control unit 203 is notified of a use setting of printing control from a user interface (UI) 501 of the display operation unit 206 as illustrated in FIG. 3. Only when it receives settings including printing failure inspection ON, printing control ON, printing order change permission ON, and various thresholds from a user, the control unit 203 executes the following printing control.

Figure 4:
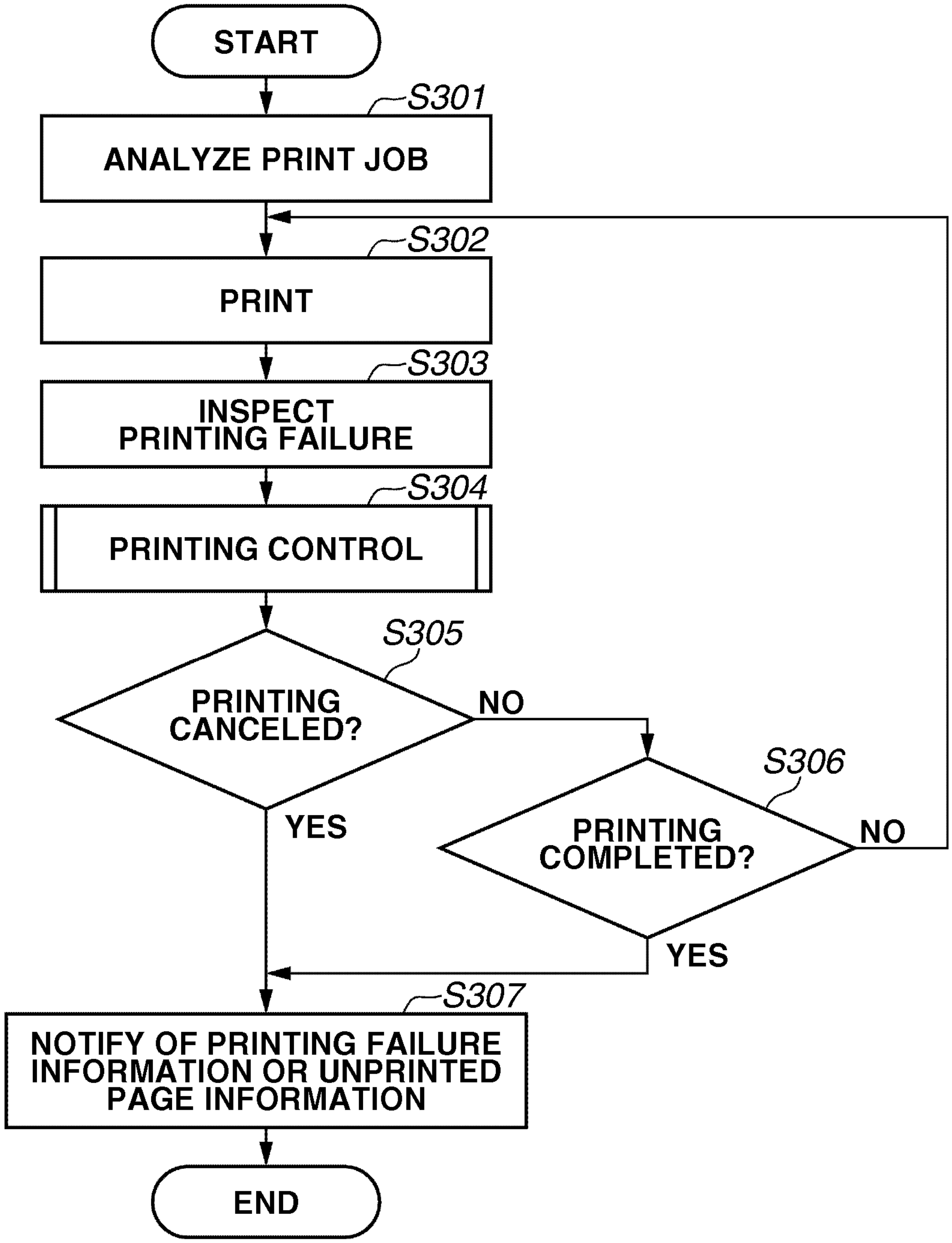
FIG. 4 is a flowchart illustrating an example of printing control.

Referring to a flowchart illustrated in FIG. 4, a control procedure of the printing system 100 is described.

The terminal 102 of the printing system 100 transmits a created print job to the printing apparatus 101 via the network connection unit 210.

In step S301, the analysis unit 209 of the printing apparatus 101 analyzes the print job received via the network connection unit 210 or a print job stored in the storage unit 204, and extracts a structure of the job, print setting, and information about a drawing object to notify the control unit 203 of the extracted information. The structure of the job or the print setting is, for example, information indicating which record each page belongs to or what print setting is set by the pages, by the records and by the jobs. The information about the drawing object indicates, for example, which page uses the drawing object, a drawing position of the object, a type of the object (whether reuse is instructed), or the number of object appearing times.

The analysis unit 209 rasterizes data of each page of the print job to create image data, and transfers the image data of each page to the printing unit 207. The image data of each page is stored in the storage unit 204. The stored image data can be automatically deleted when it is determined that there is no residual capacity of the storage unit or the image data is no need.

In step S302, the control unit 203 controls the sheet feeding unit 205 to feed a sheet designated by the print job. The printing unit 207 prints an image based on the image data on the fed sheet. In this case, when determining that a condition of a page removed from a printing target set in step S304 described below is satisfied, the control unit 203 skips printing of the page to print a next page.

Figure 5:
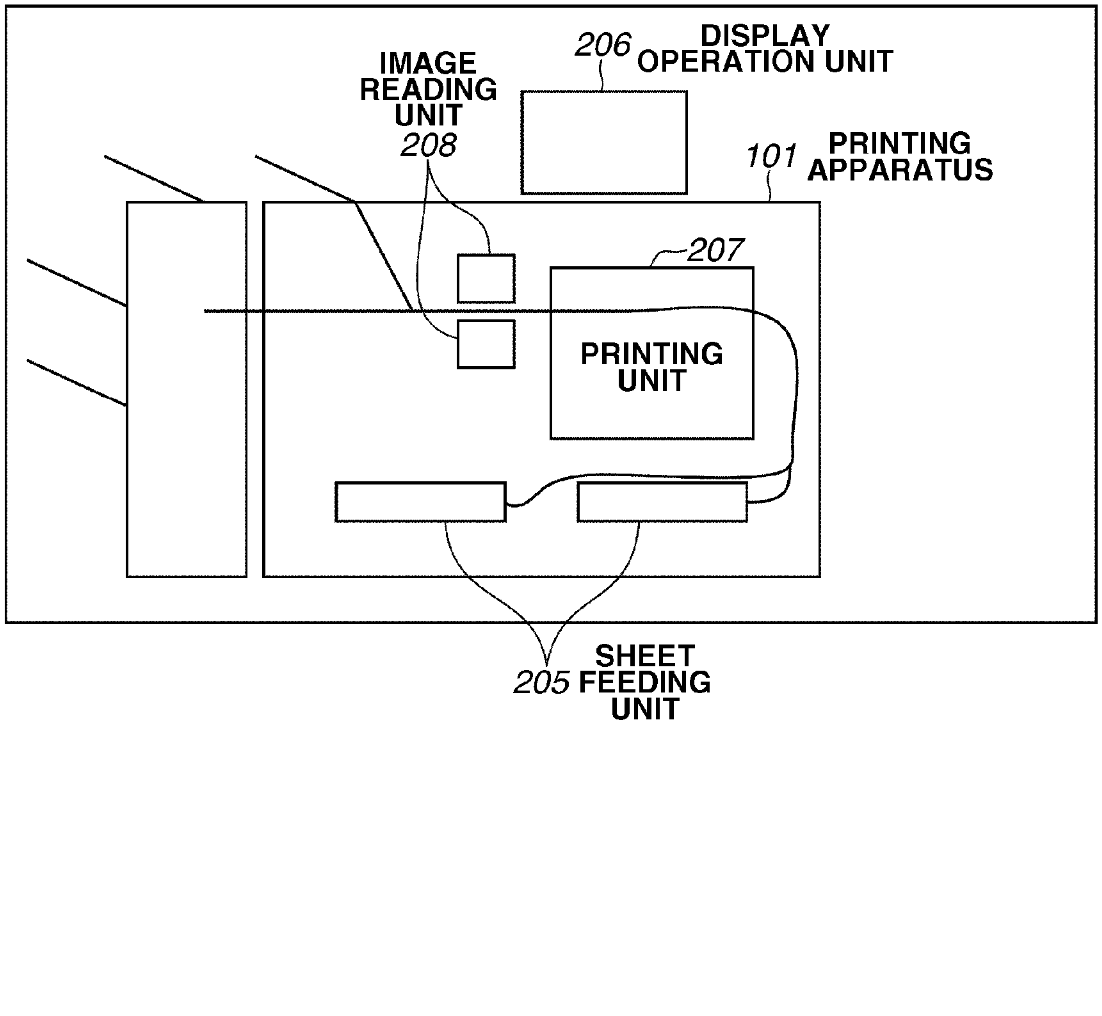
FIG. 5 illustrates an example of the printing apparatus.

As illustrated in FIG. 5, when a printed product printed by the printing unit 207 reaches the image reading unit 208, in step S303, the control unit 203 inspects the printed product for a printing failure. More specifically, the control unit 203 reads an image of the printed product by the image reading unit 208, and transfers the read image to the control unit 203.

The control unit 203 reads image data (a reference image) of a page corresponding to the read image from the storage unit 204, and compares the read image with the reference image to determine whether a difference between information pieces (color or density) of respective pixels exceeds a threshold value. Based on the number, distribution, and positional information of pieces of pixel information a difference of which exceeds the threshold value, the control unit 203 detects a printing failure, such as density unevenness, density fluctuation, positional shifting, and a flaw, stain sticking, omission or blurring of the printed product.

The control unit 203 determines whether the printing failure is associated with the drawing object, and stores the determination result in the storage unit 204. For example, the control unit 203 determines whether a difference between a drawing position of each drawing object analyzed by the analysis unit 209 and positional information of the detected printing failure is within a threshold value. The control unit 203 determines that the drawing object whose difference between the positional information of the printing failure is smallest and within the threshold value is associated with the printing failure, and stores dependence between the printing failure and the drawing object in the storage unit 204.

The control unit 203 classifies inspection results of printing failures for every associated drawing objects, further classifies them according to types of the printing failures, and measures the number of occurrences of printing failures (a list of printing failure results) to store it in the storage unit 204. For example, the control unit 203 classifies the inspection results of printing failures according to types of printing failures (density unevenness or flaws), positional information, and types of drawing objects (reusable, variable, or none) to store the number of occurrences of printing failures in the storage unit 204.

The control unit 203 manages reusable objects individually, such as reusable objects 1, 2, . . . , and n. The reusable objet is an object commonly used by jobs. When the object includes an element causing a printing failure, there is a high possibility that the same printing failure will occur in the other pages that use the object.

According to the present exemplary embodiment, the control unit 203 manages a result of a printing failure for each reusable object to appropriately determine a printing failure likely to occur because the object is a reusable object and control printing.

A variable object varies from one page to another, and hence management is not necessary for each object, and the number of occurrences is classified as a group of variable objects.

"None" means a printing failure detected at a place where there is no drawing object. For example, a printing failure such as a stain or a flaw in an area having no drawn image is classified to the type of None.

For example, the control unit 203 stores a reusable object 1 (density unevenness 1: 2 times, density unevenness 2: 1 time, flaw: 0 time, blurring: 1 time), a variable object (density unevenness: 0 time, flaw: 1 time, and blurring: 0 time), and None (density unevenness: 0 time, flaw: 0 time, and blurring: 0 time). The reusable object 1 is differentiated between the density unevenness 1 and the density unevenness 2 because results are managed as different printing failures since the places of density unevenness are different. Such management of inspection results enables determination as to which of a continuous phenomenon and an accidental phenomenon printing failures are by tracing the number of occurrences of similar printing failures, or whether the printing failures are caused by a drawing object.

In step S304, the control unit 203 determines printing control based on the inspection result of printing failure. When the printing is determined to be continued based on the inspection result, the control unit 203 proceeds the processing to step S305 and step S306.

In step S304, when the printing failure is determined to be dependent on a specific drawing object based on the inspection result, the control unit 203 stores a removal condition for removing a range including the object from a printing target in the storage unit 204. Then, the control unit 203 proceeds the processing to step S305 and step S306.

In step S304, when it is determined based on the inspection result that the printing should be canceled (when maintenance of the printing apparatus is determined to be necessary), the control unit 203 notifies the display operation unit 206 of a cause of the cancelation, and proceeds the processing to step S305 and step S307 to end the printing.

When it is determined that printing of all pages to be printed has been completed (YES in step S306), the control unit 203 proceeds the processing to step S307 to end the printing. When there are still pages to be printed (NO in step S306), the control unit 203 returns the processing to step S302 to continue a series of processes.

Figure 6:
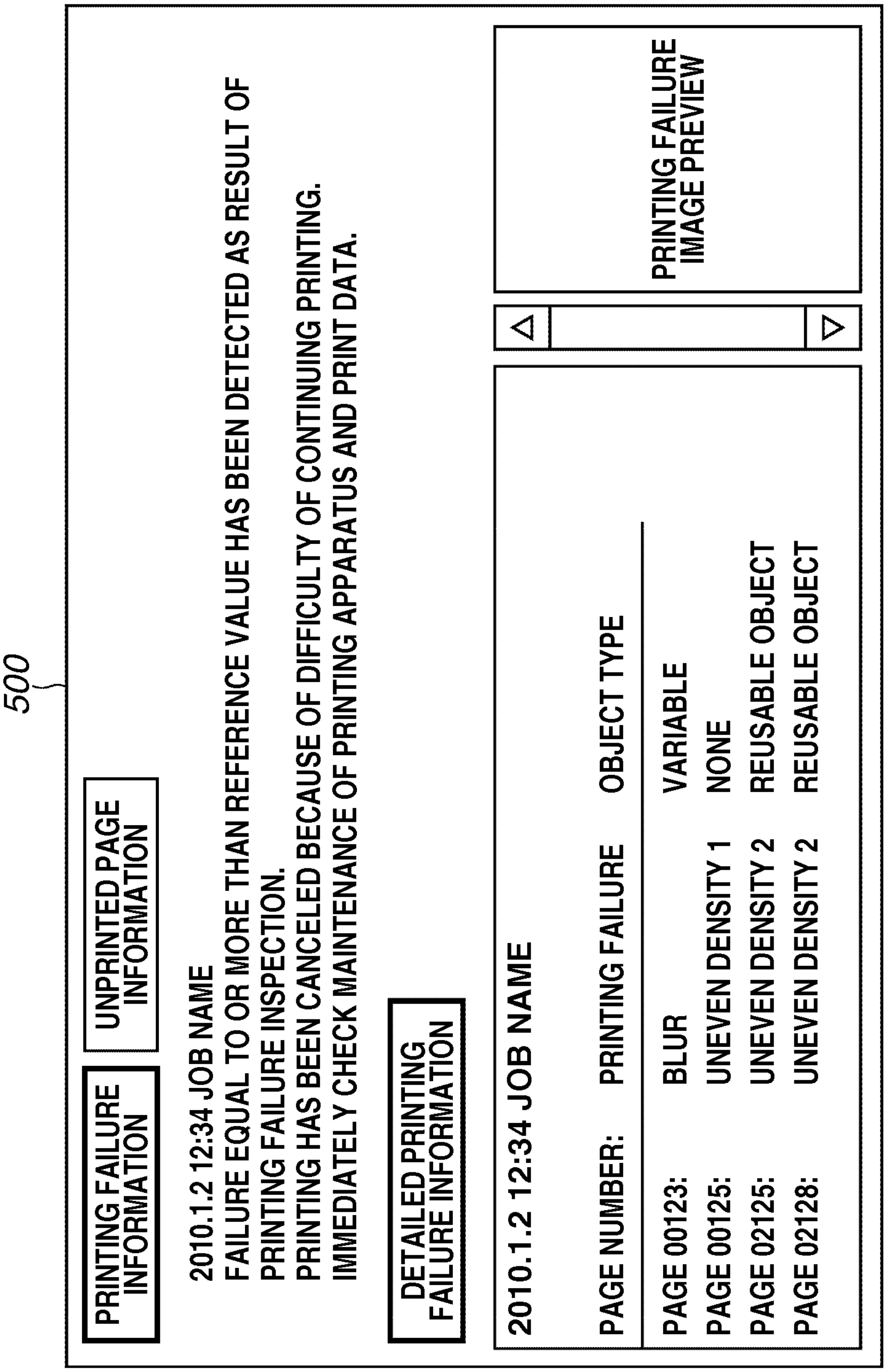
FIG. 6 illustrates an example of a display screen displayed when printing is canceled.

In step S307, after completion of the printing, the control unit 203 notifies the operator of a result of printing failure inspection. When the printing is canceled or continued by excluding a certain range, the control unit 203 notifies the operator of information of unprinted pages. As a method for notifying the operator of the information of the unprinted pages by the control unit 203, for example, a screen 500 illustrated in FIG. 6 can be displayed on the display operation unit 206, or the information can be transmitted to an operator terminal.

Figure 7:
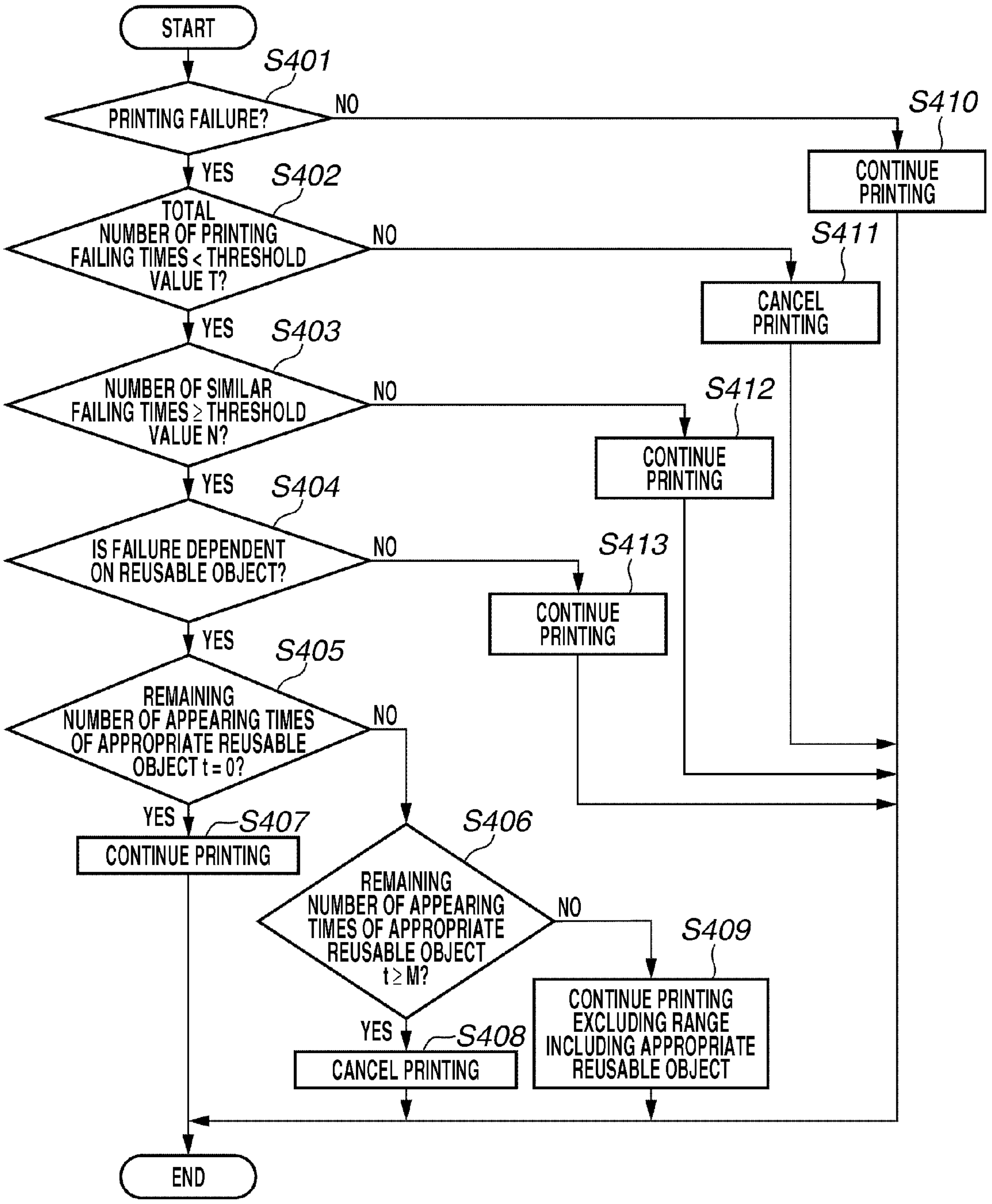
FIG. 7 is a flowchart illustrating an example of printing control determination.

Referring to FIG. 7, the printing control is described in detail below.

In step S401, when there is determined no printing failure as a result of the printing failure inspection (NO in step S401), the control unit 203 proceeds the processing to step S410 to continue the printing. When there is determined a certain printing failure as a result of the printing failure inspection (YES in step S401), the control unit 203 proceeds the processing to step S402 to execute next printing control determination.

In step S402, the control unit 203 compares a total number of occurrences of the printing failures in the print job with a threshold value T to determine printing control.

When printing failures frequently occur, there may be a problem in the printing apparatus or the print data itself, and there is a high possibility that printing failures will occur in the future. Hence, it is desirable that the printing is canceled to review the print data or to do maintenance of the printing apparatus.

Thus, when the total number of occurrence of the printing failures exceeds the threshold value T (NO in step S402), the control unit 203 determines that printing failures will continuously occur in the future, and proceeds the processing to step S411 to cancel the printing.

When the total number of occurrence of the printing failures does not exceed the threshold value T (YES in step S402), the control unit 203 proceeds the processing to step S403 to determine next printing control. For example, the threshold value T can be experimentally determined using a value set via the display operation unit 206. The control unit 203 can automatically calculate and set 5% of the number of pages of all the jobs.

In step S403, the control unit 203 compares, based on the list of printing failure results, the number of occurrences of each classified printing failure with a threshold value N to determine printing control. In this case, based on the number of occurrences of each classified printing failure, the control unit 203 determines whether the occurred printing failure is a continuous printing failure associated with a drawing object or an accidental printing failure.

For example, a case of a reusable object 1 (density unevenness 1: 2 times, density unevenness 2: 1 time, flaw: 0 time, and blurring: 1 time) is considered in the case of threshold value N=2. In this case, a printing failure (density unevenness 1) of the reusable object 1 occurs twice. Thus, the density unevenness 1 of the reusable object 1 can be determined to be a continuous printing failure. On the other hand, a printing failure (density unevenness 2, and blurring) of the reusable object 1 can be determined to be an accidental printing failure because it occurs only once.

The control unit 203 compares, based on the list of printing failure results, the number of occurrences of each classified printing failure with a threshold value N. When none exceeds the threshold value N (NO in step S403), the control unit 203 proceeds the processing to step S412 to continue the printing.

The control unit 203 compares, based on the list of printing failure results, the number of occurrences of each classified printing failure with a threshold value N. When any one of printing failures exceeds the threshold value N (number of occurrences of the printing failure is equal to or more than a set number of times: YES in step S403), the control unit 203 proceeds the processing to step S404. For example, the threshold value N can be experimentally determined using a value set via the display operation unit 206. The control unit 203 can automatically calculate and set the threshold value N based on a use environment such as a temperature and humidity of the printing apparatus.

In step S404, based on the list of printing failure results, the control unit 203 determines whether a type of a drawing object where the number of occurrences of the printing failure exceeds the threshold value N in step 403 is a reusable object.

The reusable object is commonly used among jobs and if the object includes an element causing the printing failure, there is a high possibility that the same printing failure will occur in the other pages that use the object in the future.

Therefore, when types of all drawing objects where the number of occurrences of the printing failure exceeds the threshold value N in step 403 are other than reusable object or a printing order is not permitted to be changed (NO in step S404), the control unit 203 proceeds the processing to step S413 to continue the processing.

When types of the drawing objects where the number of occurrences of the printing failure exceeds the threshold value N in step 403 include the reusable object and the printing order is permitted to be changed (YES in step S404), the control unit 203 proceeds the processing to step S405 to determine next printing control.

In step S405 and step S406, since the printing failure depending on a specific reusable object has occurred, the control unit 203 determines printing control based on the number of appearing times of the reusable object in remaining pages to be printed.

When the number of appearing times of the reusable object in the remaining pages is zero (YES in step S405), the objet will not appear in the future. Thus, no printing failure dependent on the object will occur. Therefore, the control unit 203 proceeds the processing to step S407 to continue the printing.

In the other case (NO in step S405), the control unit 203 proceeds the processing to step S406. For example, a threshold value M for determining the number of appearing times can be experimentally determined using a value set via the display operation unit 206. The control unit 203 can automatically calculate and set 10% of the number of appearing times of the reusable object in all the jobs.

When the number of appearing times of the reusable object in the remaining pages exceeds the threshold value M (YES in step S406), the control unit 203 proceeds the processing to step S408 to cancel the printing.

When the number of appearing times of the reusable object in the remaining pages does not exceed the threshold value M (NO in step S406), the control unit 203 proceeds the processing to step S409 to continue the printing by removing pages including the reusable object.

In the case of variable printing, finishing may be set by records, or reprinting by records may be expected. In such a case, instead of removing the pages including the reusable object, the pages should be removed by records including the pages.

The control unit 203 can accordingly proceed, based on predetermined units to be removed, the processing to continue the printing while executing removal by pages or records. The units to be removed can be set in advance to pages or records on a setting screen of printing control of the display operation unit 206.

Thus, considering the dependence of the cause of printing failures on the reusable object enables automatic execution of appropriate printing control, and printing productivity can be improved.

The control unit 203 initializes the inspection results of printing failures by jobs. However, when the reusable objects include an object used among jobs (declared to be global), the control unit 203 carries over only a printing failure result of the reusable object to a subsequent job. In such a case, the control unit 203 can initialize the inspection result of the printing failure at a timing of deleting the global object.

A second exemplary embodiment is described below. When printing failures are classified, it may be difficult for a certain print job to determine whether an object includes a cause of the printing failure. For example, a job in which an appearing position of a reusable object is the same among pages is described. When similar printing failures (flaws) are detected at the same place in a place of a specific reusable object, there can be two causes of the printing failures.

One is a case where a cause of a flaw is buried in the reusable object, and the other is a case where a sheet is flawed due to a flaw or dust of a drum. In the latter case, printing failures periodically occur. However, depending on timing, detection results identical to those of the former case may occur. In this case, it is difficult to accurately determine whether the printing failure is the one depending on an object or a periodic failure such as a flaw of the drum. In such a case, therefore, the following processing can be executed.

More specifically, the control unit 203 executes the same processing as that of the first exemplary embodiment up to step S404 illustrated in FIG. 7. In step S405, to determine whether the printing failure is dependent on an object, the control unit 203 creates verification data where a layout of a drawing object of the last print data is changed, and breaks before a next page is printed with the verification data to execute printing thereof. An output destination of a printed product of the verification data should not be mixed with that of a normal printed product, and hence the control unit 203 discharges the verification data to another discharging destination.

The control unit 203 can execute printing failure inspection of the verification data, and compare the detection result of the printing failure in the verification data with the last detection result to determine whether a similar printing failure has occurred in the same reusable object. Since the verification data has the layout of the object different from the comparison target print data, thus if similar printing failures occur in the same reusable object, the printing failures can be determined to be dependent on the object.

When a similar printing failure occurs on another object while a position of the printing failure is not changed, it can be determined that the printing failure is a periodic printing failure such as a flaw of the drum. After the determination as described above, the control unit 203 proceeds the processing to steps S406 and after illustrated in FIG. 7 as in the case of the first exemplary embodiment.

As described above, the present exemplary embodiment performs the interruption printing of the verification data in which the layout of the object has been changed from the comparison target print data, and compares the inspection results of the verification data and the comparison target print data, so that whether the printing failure is dependent on the object can be accurately determined, and appropriate printing control can be automatically executed. According to the present invention, appropriate printing control can be automatically executed to improve printing productivity.

Aspects of the present invention can also be realized by a computer of a system or apparatus (or devices such as a CPU or a micro processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-290205 filed Dec. 27, 2010, which is hereby incorporated by reference herein in its entirety.

What is claimed is:

1. A printing apparatus capable of processing a variable data printing job including a plurality of records, the printing apparatus comprising:

a determination unit configured to determine whether a number of occurrences of printing failures depending on a reusable object included in the variable data printing job is greater than or equal to a set number of times, and whether a number of appearing times of the reusable object on remaining pages of the variable data printing job is less than a set value; and a printing control unit configured to control whether to continue or cancel the variable data printing job based on a determination result of the determination unit.

2. The printing apparatus according to claim 1, wherein if the determination unit determines that the number of occurrences of printing failures depending on the reusable object is greater than or equal to the set number of times and that the number of appearing times of the reusable object on the remaining printing target pages is less than the set value, the printing control unit continues printing of the variable data printing job, where data containing the reusable object is excluded.

3. The printing apparatus according to claim 2, wherein if the data containing the reusable object is excluded, the printing control unit excludes the data containing the reusable object on a page or record basis based on a setting to continue the printing of the variable data printing job.

4. The printing apparatus according to claim 1, wherein if the determination unit determines that the number of occurrences of printing failures depending on the reusable object is greater than or equal to the set number of times and that the number of appearing times of the reusable object on the remaining printing target pages is greater than or equal to the set value, the printing control unit cancels printing of the variable data printing job.

5. The printing apparatus according to claim 1, further comprising a notification unit configured to notify of information of a page printing of which is not yet completed if the printing control unit executes control to cancel printing of the variable data printing job.

6. The printing apparatus according to claim 1, wherein if the reusable object is used by other variable data printing jobs, the printing control unit passes the number of occurrences of printing failures to at least one of the other variable data printing jobs.

7. A method for controlling printing performed by a printing apparatus capable of processing a variable data printing job including a plurality of records, the method comprising:

determining whether a number of occurrences of printing failures depending on a reusable object included in the variable data printing job is greater than or equal to a set number of times, and whether a number of appearing times of the reusable object on remaining pages of the variable date printing job is less than a set value; and continuing or canceling the variable data printing job based on a result of the determination.

8. The method according to claim 7, wherein if that the number of occurrences of printing failures depending on the reusable object is greater than or equal to the set number of times is determined and that the number of appearing times of the reusable object on the remaining printing target pages is less than the set value is determined, printing of the variable data printing job is continued, where data containing the reusable object is excluded.

9. The method according to claim 8, wherein if the data containing the reusable object is excluded, the data containing the reusable object is excluded on a page or record basis based on a setting to continue the printing of the variable data printing job.

10. The method according to claim 7, wherein if that the number of occurrences of printing failures depending on the reusable object is greater than or equal to the set number of times is determined and that the number of appearing times of the reusable object on the remaining printing target pages is greater than or equal to the set value is determined, printing of the variable data printing job is canceled.

11. The method according to claim 7, further comprising notifying information of a page printing of which is not yet completed if control to cancel printing of the variable data printing job is executed.

12. The method according to claim 7, wherein if the reusable object is used by other variable data printing jobs, the number of occurrences of printing failures to at least one of the other variable data printing jobs are passed.

13. A computer-readable storage medium storing a program for causing a computer to execute a method for controlling variable data printing, the method comprising:

determining whether a number of occurrences of printing failures depending on a reusable object included in the variable data printing job is greater than or equal to a set number of times, and whether a number of appearing times of the reusable object on remaining pages of the variable data printing job is less than a set value; and continuing or cancelling the variable data printing job based on a result of the determination.

14. The computer-readable storage medium according to claim 13, wherein if that the number of occurrences of printing failures depending on the reusable object is greater than or equal to the set number of times is determined and that the number of appearing times of the reusable object on the remaining printing target pages is less than the set value is determined, printing of the variable data printing job is continued, where data containing the reusable object is excluded.

15. The computer-readable storage medium according to claim 14, wherein if the data containing the reusable object is excluded, the data containing the reusable object is excluded on a page or record basis based on a setting to continue the printing of the variable data printing job.

16. The computer-readable storage medium according to claim 13, wherein if that the number of occurrences of printing failures depending on the reusable object is greater than or equal to the set number of times is determined and that the number of appearing times of the reusable object on the remaining printing target pages is greater than or equal to the set value is determined, printing of the variable data printing job is canceled.

17. The computer-readable storage medium according to claim 13, further comprising notifying information of a page printing of which is not yet completed if control to cancel printing of the variable data printing job is executed.

18. The computer-readable storage medium according to claim 13, wherein if the reusable object is used by other variable data printing jobs, the number of occurrences of printing failures to at least one of the other variable data printing jobs are passed.

* * * * *